Patented July 2, 1940

2,206,131

UNITED STATES PATENT OFFICE 2,206,131

PROCESS FOR MAKING CORRECTED MAGNESIA REFRACTORIES

Gilbert E. Seil, Cynwyd, Pa., assignor to E. J. Lavino and Company, Philadelphia, Pa., a corporation of Delaware No Drawing. Application February 2, 1937, Serial No. 123,603

2 Claims. (Cl. 106—9)

This invention relates to refractory materials and shapes, such as bricks, and to the manufacture thereof. More particularly it relates to refractory bodies of improved characteristics composed of a corrected magnesia material.

Magnesia materials for the manufacture of refractory shapes are usually prepared from natural magnesite or other mineral compounds which on being sufficiently heated yield a product which is principally crystallized magnesia or periclase. The magnesite is preburned to a temperature at which the carbon dioxide is driven off and at which the magnesia is crystallized. The magnesia material thus prepared is cooled, ground and formed into shapes which are then dried and burned in a suitable kiln. The primary component in a brick so prepared is crystallized magnesia containing absorbed iron oxide, and the secondary component consists of various glasses, depending on the method of manufacture and on the impurities in the original material. At elevated temperatures these glasses act as a bond for the particles of crystallized magnesia. The body contains a variety of crystals, such as magnesium orthosilicate ($2MgO.SiO_2$) and monticellite ($MgO.CaO.SiO_2$) in addition to the two major components, which are periclase and magnesium ferrite. Although thin sections of these magnesia refractories show various crystals when the refractory is cold, when the refractory is heated to the softening point of any of the components, or to the melting point of the lowest melting crystal, a bond of varying composition is formed that is plastic above these temperatures. Much of the difficulty encountered with this type of refractory is due to the variation characteristics and properties of the secondary component at different temperatures, causing failure under load at relatively low temperatures which limits the use of the refractory.

One of the objects of this invention is to eliminate this difficulty in magnesia refractories by the correction of the magnesia material to produce a refractory body, the secondary component of which is virtually entirely a crystalline refractory material of high melting point.

Complete elimination of the secondary (or glassy) component in the refractory body is not practical because of the difficulty and expense of obtaining pure magnesia materials. Furthermore, I have found that brick made of pure crystalline magnesium oxide have a relatively low load-carrying capacity at high temperatures, due to the fact that the crystal cleavage of the periclase permits slippage under load in the crystals at high temperatures.

All the commercially available deadburned magnesia materials contain secondary components which form glassy bonds when used for the manufacture of refractory bodies. If the deadburned material contains iron ($Fe_2O_3$) it is either in the form of magnesium ferrate or in solid solution in the crystallized magnesia. Whether these raw magnesia materials contain iron in appreciable quantities or not, they do contain varying amounts of silica and of lime. A typical analysis of a well crystallized magnesia material containing a relatively small percentage of iron and of other impurities, is as follows:

| | Per cent |
|---|---|
| MgO | 90.80 |
| $Fe_2O_3$ | 1.02 |
| $Al_2O_3$ | 0.37 |
| $SiO_2$ | 5.34 |
| CaO | 2.23 |

When such a material is crushed and made into brick by the usual process, the resulting product exhibits weaknesses due to the presence of a glassy bond. It is another object of this invention to overcome this weakness by the formation of a virtually entirely crystalline refractory bond in such quantities that the glasses present will be distributed, practically uniformly, in the crystalline bond in such low concentrations, or are so diluted, that their deleterious effects will not only be minimized, but will be, for all practical purposes, eliminated.

Although it is among the objects of this invention to overcome the disadvantages of magnesia refractory materials containing a glassy bond by the dilution of that glass with a crystalline, high melting point bond, this invention is based upon my discovery that the method of formation of the crystalline bond, and the physical placement of the crystalline bond are the most important factors in determining the characteristics which that crystalline bond will give to the finished refractory body. I have found that when the crystalline bond is developed on the surfaces of the individual particles of the crystallized magnesia (periclase) by a heat-induced reaction between the periclase and the bond forming material, in such a manner that the individual grains of the periclase are coated or enameled with thin films of the bonding crystals, a refractory body of greatly improved characteristics results. This will become apparent from the following description.

The starting materials in the practice of this invention are dead burned magnesia material and silica. The magnesia material consists mainly of well developed periclase, and is crushed to a grind suitable for refractory manufacture. The silica is preferably in the form of flour, but is at least so finely divided that the major portion passes a 100 mesh Bureau of Standards screen. The desired proportions of the magnesia material and the silica are thoroughly mixed, then tempered and made into brick by known methods, and the brick are burned in a suitable kiln on a time-temperature cycle which will insure complete conversion of the finely divided silica to magnesium orthosilicate ($2MgO.SiO_2$) by reaction with the surfaces of the periclase grains. The refractory body produced in this manner will consist of periclase grains, surrounded by thin films of magnesium orthosilicate which are cemented to, or enameled on, the periclase grains, and will have improved characteristics over a body of similar composition, but differently prepared.

For example, consider the difference between three refractory bodies, each of which on chemical analysis shows 83% MgO and 17% $SiO_2$, and which on petrographic analysis show 60.4% periclase and 39.6% magnesium orthosilicate. The first of these bodies has been prepared by heating to stabilization an intimate mixture of 71.66 parts of periclase (MgO) and 29.34 parts of magnesium silicate ($MgO.SiO_2$). Since commercial magnesium silicate has a melting point of about 2300° F., liquids are formed in the body when the temperature exceeds 2300° F., the mobile liquid will penetrate into the periclase crystals, and when the mass has become stabilized, it will be found to consist of an intimate mixture of magnesium orthosilicate and periclase, with the magnesium orthosilicate disseminated throughout the periclase grains. The second of these bodies consists of an intimate mixture of 83 parts of finely divided periclase and 17 parts of finely divided silica. In this case no liquids are formed in the mass until the temperature exceeds that at which magnesium orthosilicate forms, that is 2900° F. In this case again the body after stabilization consisted of an intimate mixture of forsterite and periclase, and though the melting point of the product is high enough for refractory purposes, the resulting physical structure is unsuited for manufacturing brick of the highest quality. The third body consists of a mixture of 83 parts of crushed and carefully sized periclase (which is relatively coarse) and 17 parts of silica flour. When the temperature of this thoroughly mixed mixture exceeds 2900° F., reaction is effected between the finely divided silica and the surfaces of the periclase grains with which the silica is in surrounding contact. After the reaction has been completed, the body will consist of separate and discrete grains of periclase, each of which is surrounded and bonded by a layer of complex material, mainly magnesium orthosilicate. This layer is formed in situ by a heat induced reaction between silica and the periclase grain under controlled conditions to yield the particular complex material desired, in the form of interlocking, tightly held grains, that is, the layer is cemented to, or enameled onto, the surface of the periclase grains, and a very desirable structure for refractory bodies has been attained.

In the practice of this invention, an intermediate reaction product magnesium metasilicate is formed. The intermediate product, however, is not formed until the mass has reached a temperature above 2900° F. At this temperature the metasilicate reacts very rapidly with more magnesia to form the magnesium orthosilicate. In other words, the invention is practiced so that the liquid phase in the formation of the orthosilicate is passed in the minimum time so that the deleterious effects, such as warpage, are eliminated. Causing the reaction to take place at a temperature higher than the critical temperature at which magnesium orthosilicate forms rapidly is a very important feature of the invention.

It is, therefore, a further object of this invention to produce a corrected magnesia refractory comprising periclase in a discrete and nonconnected granular or aggregate formation, with the individual grains of periclase substantially free from silica contamination, and with each individual grain of periclase surrounded by and encased in a layer of magnesium orthosilicate material which adheres thereto by virtue of the forsterite having been formed upon the surface of the periclase by a heat induced reaction between the contacting surfaces of the periclase and the silica.

With these and possibly other objects in view, the advantages of the invention may be realized by the following example, which typifies one method of practicing the invention:

To 100 parts by weight of dead burned, crystallized magnesia of the analysis previously given, crushed and prepared to pass a 6 mesh Bureau of Standards screen, but with more than 50% retained on a 100 mesh Bureau of Standards screen, are added 14 parts by weight of silica flour or other finely divided silica. The fineness of the silica should be such that the major portion thereof will pass a 325 mesh Bureau of Standards screen, and virtually all of it will pass a 100 mesh Bureau of Standards screen. The materials are thoroughly mixed in a suitable dry mixer, then tempered in a wet pan such as is commonly used in refractory manufacture, and then pressed into brick, which are dried and burned. I prefer to burn the shaped refractories at a temperature between 3100° F. and 3450° F., but the time temperature curve is such that the conversion of a part of the silica with all the lime and a part of the magnesia to monticellite is accomplished, and that the remainder of the silica and a further portion of the magnesia are converted to forsterite. I limit the maximum temperature to 3450° F. because at and beyond this temperature the forsterite penetrates the periclase granules and, therefore, the granules of periclase are impregnated with, instead of being surrounded by, a film of forsterite.

By this method a refractory body is produced of approximately the following chemical and petrographic analyses:

CHEMICAL ANALYSIS

| | Per cent |
|---|---|
| $Fe_2O_3$ | 2.62 |
| $Al_2O_3$ | 0.79 |
| $SiO_2$ | 16.12 |
| CaO | 1.93 |
| MgO | 78.24 |

PETROGRAPHIC ANALYSIS

*Primary component*

| | Per cent |
|---|---|
| Periclase | 58.01 |

*Secondary component*

| | Per cent |
|---|---|
| Magnesium orthosilicate | 32.90 |
| Monticellite | 5.38 |

In this brick all the lime in the original magnesia material has been converted to monticellite ($MgO.CaO.SiO_2$) and the silica over and above that required for the formation of monticellite has been converted to magnesium ortho-silicate, which has so diluted the monticellite that its effect is minimized. Further, the magnesium ortho-silicate has been physically located in such a way that there has been produced a structural network of magnesia as a base or grog, each grain of which is completely surrounded by an adhering mixture of monticellite and forsterite, with the forsterite greatly in excess of the monticellite.

The invention can be carried out with ordinary commercial equipment, and without unusually close analytical control or supervision. The addition of larger amounts of silica within critical limits, controls the thickness of the coating or enameled surface of magnesium orthosilicate on the individual grains of periclase. In other words, the restrictions in the manufacture are very broad.

The advantages of proper physical structure are very apparent when the brick manufactured by the above procedure is compared with a brick similar in chemical and petrographic analyses, but prepared so as to yield a structure in which the magnesium ortho-silicate is disseminated throughout the periclase grains, and which consists of a more or less uniform mixture of periclase and magnesium ortho-silicate. Actual results in which the product of this invention is called brick A and the comparative brick of a uniform mixture of periclase and forsterite is called brick B follows.

Comparative spalling losses in a standard dry panel spalling test at 2500° F.:

| | Per cent |
|---|---|
| Brick A | 26.6 |
| Brick B | 40.6 |

Failure under load of 25 pounds per square inch at standard refractory load test heating cycle:

| | °F. |
|---|---|
| Brick A; did not fail at | 3000 |
| Brick B | 2993 |

Subsidence under own weight standing on end after five hours at 2900° F. (Standard refractory sagging test):

| | Per cent |
|---|---|
| Brick A | 0.34 |
| Brick B | 1.17 |

The practice of the invention is, of course, not limited to the example cited.

For the purpose of clarifying the meaning of the phraseology used herein, it is pointed out that a crystal is an individual particle having very definite physical characteristics, such as, index of refraction, number of faces, angular relationship between faces, specific gravity, etc.

On the other hand, grains are composed of crystals that are bonded together by varying amounts of extraneous materials. The grain shape varies in accordance with the method of preparation. The mean specific gravity of the grain varies with its composition, although the composition of the crystals that are in the grain is constant. The amount of extraneous material in the grains varies.

What is found in a usual magnesite brick are grains composed of periclase crystals, bonded together with various mineral substances, some of which are crystalline and some of which are not crystalline. Among the materials that bond the individual crystals together to make grains of them are monticellite, magnesium orthosilicate, merwinite, and if the silica-lime ratio is proper (which means when the molecular percentage of lime approaches twice the molecular percentage of the silicate present) one may find shannonite, larnite and various other orthosilicates of lime, and lime and magnesia. But as explained herein, it is the presence of these uncontrollable orthosilicates that influence the physical characteristics and the chemical behavior of the finished brick.

A portion of the materials in the brick, other than the periclase in the grains, is partially exuded from the grain and forms a bond between the grains, holding the brick together. Unfortunately, due to the variation in the constitution of the extraneous material in the grain, the exuding bond varies and therefore different portions of the same brick have different physical and chemical properties and characteristics. To overcome this, it has been found that the formation of magnesium orthosilicate around the grains, through reaction of silica with the surfaces of the grains, gives a uniform bond between the grains, and to a great extent, prevents the material that bonds the crystals into grains from leaving the individual grain to influence the characteristics of the bond formed during the burning of the brick. Thus, the magnesium orthosilicate envelope that is formed in situ seals the grain or aggregate of periclase crystals and their bonding material against ingress to the grains of undesirable inclusions (such as silica) and against egress from the grains of the bonding material thereof during burning of the refractory substance into bricks or other shapes.

By this invention, it is necessary to yield enough magnesium orthosilicate to form a thin film on the surfaces of substantially all the grains in the brick and thereby to seal the grain into an individual compartment filled with periclase crystals bonded with the normal impurities in the natural rock from which the periclase was prepared.

As far as size is concerned, the individual crystals of periclase are far smaller than the individual grains used in the manufacture of brick. There may be anywhere from ten to a thousand periclase crystals in one grain.

I claim:
1. The process of making a refractory body which comprises mixing grains of crystallized magnesia material and silica flour wherein the grains of crystallized magnesia will pass through a 6-mesh screen but a majority thereof will be retained on 100-mesh screen, and wherein the silica is of a fineness that substantially all will pass a 100-mesh screen and a major portion thereof will pass a 325-mesh screen and then burning the mixture to a temperature in excess of 2900° F. to effect a reaction to yield periclase grains having a coating of magnesium orthosilicate formed thereon in situ.

2. The process of making a refractory body which comprises mixing grains of magnesia of a size that substantially all will pass a 6-mesh screen and a major portion will be retained on a 100-mesh screen, with silica ground so that substantially all will pass a 100-mesh screen while a major portion will pass a 325-mesh screen, on the basis of approximately 14 parts by weight of silica to 100 parts by weight of magnesia, and subjecting the mixture to heat to a time temperature cycle of at least 2900° F. for effecting a reaction between the silica and the magnesia whereby there is yielded magnesium orthosilicate which envelopes and bonds together the magnesia grains.

GILBERT E. SEIL.